United States Patent Office

3,526,807
Patented Sept. 1, 1970

3,526,807
LASER BEAM FOR TRIGGERING A SPARK GAP AT HIGH RATE
Spartacus Barbini, Chaville, Hauts-de-Seine, France, assignor to Compagnie Generale d'Electricite, Paris, France
Filed July 24, 1967, Ser. No. 655,658
Claims priority, application France, Aug. 8, 1966, 72,441
Int. Cl. H05b 37/02, 39/04
U.S. Cl. 315—150          7 Claims

ABSTRACT OF THE DISCLOSURE

A disk comprising holes, moving in rotation on its axis, placed between a continuous high power laser and a spark gap, supplies an interrupted ionizing light beam, operating as a repetitive trigger for the spark gap at a relatively high frequency.

---

The invention relates to a device for repeatedly triggering a spark gap by ionisation of the interval between the electrodes (hereinafter called "interval") by means of a coherent light beam supplied by a laser emitter, the said device being particularly distinguished in that it permits a relatively high rate of operation.

The process of ionisation of the interval of a spark gap by a laser beam is produced either by the stripping of electrons under the effect of the thermal shock produced by the impact of the focussed laser beam on an electrode, or by the ionisation of the gas occupying the interval; this process has a duration of the order of 1 to 0.1 $\mu$s. When the gas contained in the enclosed space of the spark gap has been ionised and the cause of ionisation ceases, the deionisation time, which is the period necessary for the atoms to capture the free electrons or for the displaced electrons to return on to their initial orbits, is longer in proportion as the atom is more complex, and therefore as the atomic number is higher. For example, it is of the order of 1000 $\mu$s. for mercury and of 10 $\mu$s. for hydrogen. This deionisation time may be varied within wide limits by employing different gaseous media, such as air, nitrogen, sulphur hexafluoride, argon, helium, etc.

It will therefore be seen that, in principle, a spark gap triggered by ionisation by means of a laser beam could attain high operating rates.

Until recent times, the energy of a laser beam capable of triggering a spark gap of large dimensions could be supplied only by a solid laser (neodymium-doped glass or ruby). It is difficult to exceed a maximum rate of the order of 1 flash per second with a solid laser. Consequently, the rates at which large spark gaps could be triggered by lasers have hitherto been limited to values of the order of 1 triggering per second.

It is now known to construct gaseous flux lasers operating continuously at high power, of the order of 300 w. and more. The invention utilises these new continuous high-power lasers to supply a device for triggering a spark gap at an accelerated rate.

In accordance with the invention, a device for triggering at least one spark gap at a high rate by a radiation beam supplied by a high-power laser emitter is formed by a combination of a continuously operating high-power laser emitter, for example a gaseous flux laser, and of a disc inserted between the laser emitter and a spark gap, perpendicularly to the direction of the beam, the said disc being opaque and being formed with at least one aperture in a region situated level with the beam, and being adapted to turn so as periodically to free the passage of the beam, which can then pass through the spark gap.

With such a device, a rate of several flashes per second can readily be attained.

For a fixed speed of rotation of the disc, the rate depends upon the number of apertures in the periphery of the disc.

In accordance with another feature, a common laser serves for the repeated triggering of a number of spark gaps having different characteristics, which are disposed along the axis of the laser and receive from the laser a triggering energy which differs in each type of spark gap.

In accordance with another feature, focussing means cooperate with apertures in the shutter so as to concentrate the laser beam into a spot of small diameter which impinges either upon one of the electrodes of a spark gap or upon the gas situated between the electrodes of a spark gap.

These features, and others which will become apparent from the following description, will be set forth in detail with reference to the accompanying drawings, in which:

FIGS. 1b and 1c illustrate shutters which may be employed in the arrangement of FIG. 1a.

In the various figures, like references denote like parts.

Figure 1A:
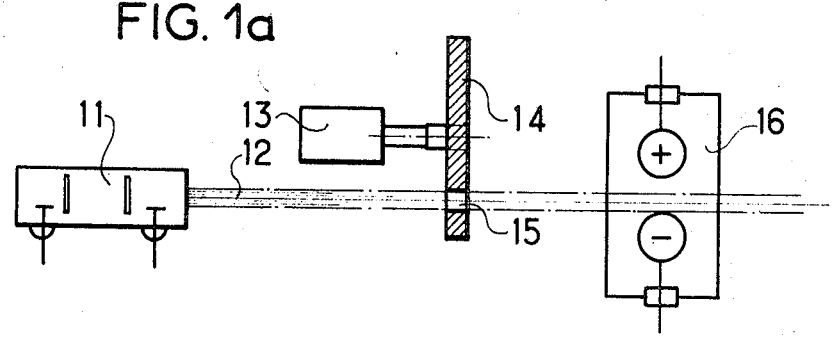
FIG. 1a is the basic diagram of an installation according to the invention.

FIG. 1a illustrates the basic arrangement of the invention. A continuously operating high-power laser, in practice a gas laser, preferably a gaseous flux laser 11, continuously emits a coherent light beam 12. A repeatedly operating shutter, for example a disc 14 formed with holes such as 15 and rotated by a motor 13, admits the radiation beam at regular intervals between the electrodes of a spark gap 16, where necessary on to one of the electrodes. The radiation energy which reaches the spark gap on passing through a hole in the path of the laser beam depends upon the diameter of the said hole (of course, up to the extent of the diameter of the beam) and upon the transit time, i.e. the speed of rotation, this energy decreasing when the speed increases.

Consequently, when the speed of rotation of the disc exceeds a certain threshold, the spark gap 16 is no longer triggered.

Figure 1B:
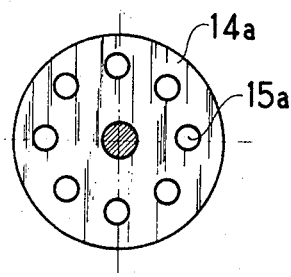

FIG. 1b illustrates a distribution of circuit holes 15a in the face of the disc 14a.

Figure 1C:
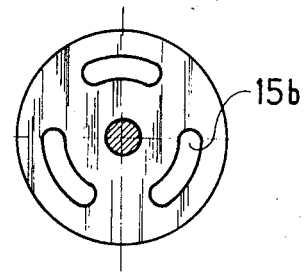

In FIG. 1c, the apertures 15b have the shape of circular sectors; this arrangement allows a larger quantity of energy to pass in each instance than a circular hole such as 15a.

Figure 2:
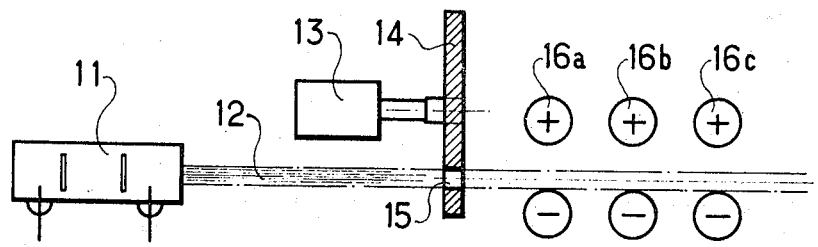
FIG. 2 illustrates an extension to the case of a plurality of spark gaps.

FIG. 2 shows in very diagrammatic form a repeated control of a number of spark gaps 16a, 16b, 16c (the number three has been taken solely by way of non-limiting example). These spark gaps may be either independent of one another or associated in series or in parallel, etc.

Figure 3A:
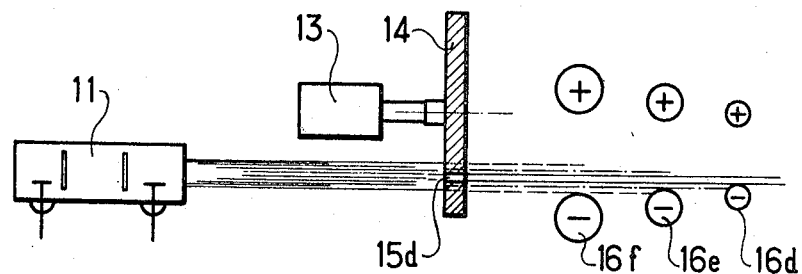
FIG. 3 illustrates an extension to the case of a plurality of spark gaps of different dimensions by means of a shutter illustrated in FIG. 3b, FIGS. 4a and 4b relate to arrangements comprising focussing lenses in two forms.

FIG. 3a shows the control by a single laser 11 of the triggering of spark gaps 16d, 16e, 16f of different dimensions. The spark gap 16f of large dimensions requires relatively high energy for its triggering. The spark gap 16e, which is of medium dimensions, requires lower energy. The spark gap 16d, which is of small dimensions, requires a relatively small quantity of energy.

Figure 3B:
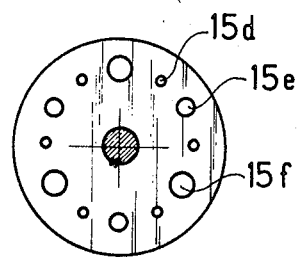

The disc is formed with apertures of three different dimensions, 15d, 15e, 15f, which are shown in FIG. 3b.

When a hole 15d is situated in front of the laser (position of FIG. 3a) only the spark gap 16d is triggered. When a hole 15e is situated in front of the laser, the spark gaps 16d and 16e are triggered. When a hole 15f is situated in front of the laser, the spark gaps 16d, 16e, 16f are triggered.

The use of apertures of different dimensions constitutes a method of modulating the power transmitted by the laser beam. Of course, other combinations of dimensions are possible within the scope of the invention, the foregoing combination having been referred to only by way of example.

Figure 4A:
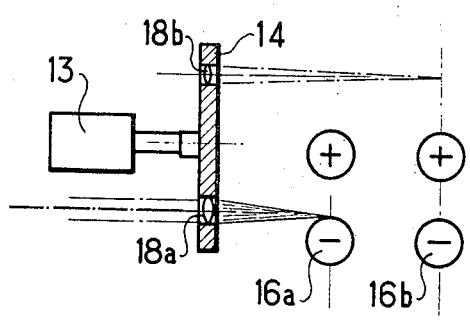
Figure 4B:
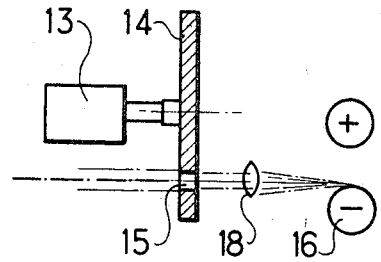

FIGS. 4a and 4b illustrate embodiments of the invention in which the apertures in a rotating perforated disc are associated with focussing means, for example lenses. In FIG. 4a, a lens 18a of relatively short focus, which is disposed in an aperture, is employed to trigger a relatively close spark gap 16a. A lens 18b of longer focus may be employed to trigger a more remote spark gap 16b.

In FIG. 4b, a lens 18 is disposed on the axis of the laser, outside the disc 14.

Figure 5A:
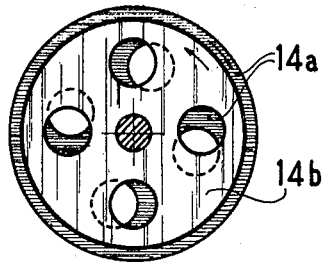
FIGS. 5a and 5b illustrate a device for adjusting the free surface of the apertures.
Figure 5B:
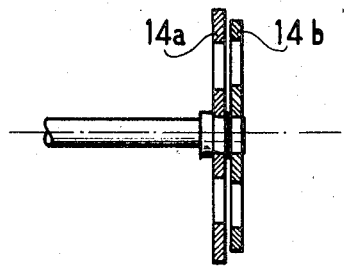

FIGS. 5a and 5b illustrate an example of a disc in which the shuttering is variable by means of a counter-disc 14b. The counter-disc 14b can turn through a limited angle about the common axis of the two discs, thereby varying the free surface afforded for the passage of the radiation beam.

Figure 6:
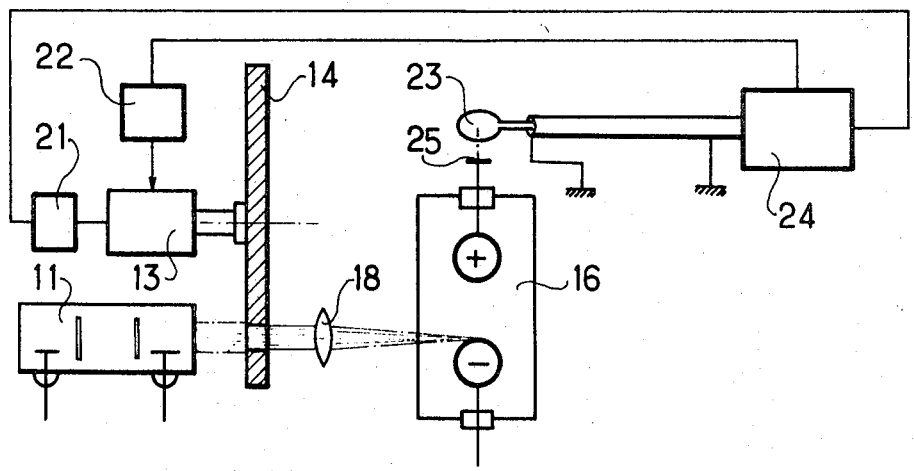
FIG. 6 is a diagram of an installation for the speed control of the shutter.

FIG. 6 illustrates a device for the servo-control of the speed of the disc, which supplies the highest possible flashing rate.

Associated with the motor 13 is a tacho-generator 21. 24 is a comparator, and 23 a member responsive to the derivative $dI/dt$ of a current I flowing through a link 25 connected to one of the electrodes of the spark gap 16, for example a Rogowski belt. 22 is a member controlling the speed of the motor 13.

The operation is as follows. It will be assumed that the motor 13 initially rotates at a speed exceeding the threshold of production of flashes. Since the member 23 supplies no current, the comparator 24 receives only the signal supplied by the tachogenerator 21 and thus applies to the member 22 an error signal which has the effect of slowing down the motor 13. When the speed of the motor 13 has been sufficiently slowed down, the spark gap 16 is triggered, which results in a signal $dI/dt$ in the Rogowski belt 23. A signal is then formed which compensates for the error signal; the speed is then stabilised at a predetermined value.

It is also possible to provide a servo-control which affects the masking action of a variable-masking disc so as to transmit a beam having the power necessary for the triggering.

What is claimed is:

1. Apparatus for triggering an electrical spark gap with a radiated beam at a high rate in excess of one spark flash per second, said apparatus comprising:

at least one pair of opposed electrodes for defining said spark gap, a high-power continuous output gas laser for continuously emitting said radiated beam in a direction passing through said spark gap, rotatable opaque means disposed in the path of said radiated beam between said laser and said spark gap, at least one beam passing aperture included in said opaque means, and driving means to rotate said opaque means for alternating blocking and then passing said beam through said beam passing aperture thereby repetitively triggering said spark gap with precise timing at a rate in excess of said one flash per second.

2. Apparatus for selectively triggering multiple electrical spark gaps with a radiated beam at a high rate in excess of one spark flash per second, said apparatus comprising:

at least two pairs of opposed electrodes defining at least first and second spark gaps, a high-power continuous output gas laser for continuously emitting said radiated beam in a direction passing through said multiple spark gaps, rotatable opaque means disposed in the path of said radiated beam between said laser and said multiple spark gaps, at least two beam passing apertures included in said opaque means, a first lens included in one of said beam passing apertures with a focal length substantially corresponding to the position of at least a first selected spark gap with respect to said first lens, a second lens included in another of said beam passing apertures with another focal length substantially corresponding to the position of at least a second selected spark gap with respect to said second lens, and driving means to rotate said opaque means for alternating blocking said beam and then passing said beam through said beam passing apertures thereby repetitively and selectively triggering said selected spark gaps with precise timing at a rate in excess of said one flash per second.

3. Apparatus for triggering an electrical spark gap with a radiated beam at a high rate in excess of one spark flash per second, said apparatus comprising:

at least one pair of opposed electrodes for defining said spark gap, a high-power continuous output gas laser for continuously emitting said radiated beam in a direction passing through said spark gap, rotatable opaque means including at least one beam passing aperture disposed in the path of said radiated beam between said laser and said spark gap, said opaque means comprising:

a rotatable disc with at least one aperture therein, a counter-disc also having at least one aperture, said counter-disc adapted to turn about a common axis in relation to said rotatable disc thus constituting a rotating shutter having adjustable apertures, and driving means to rotate said opaque means for alternately blocking said beam and then passing said beam through said beam passing aperture thereby repetitively triggering said spark gap with precise timing.

4. Apparatus as in claim 3 including a device for automatic adjustment of the position of said counter-disc in relation to said rotatable disc, whereby the diameter of the laser beam and therefore the power of said radiated beam is varied.

5. Apparatus for triggering an electrical spark gap with a radiated beam at a high rate in excess of one spark flash per second, said apparatus comprising:

at least one pair of opposed electrodes for defining said spark gap, a high-power continuous output gas laser for continuously emitting said radiated beam in a direction passing through said spark gap, rotatable opaque means disposed in the path of said radiated beam between said laser and said spark gap, a plurality of circumferentially spaced beam passing apertures included in said opaque means, each of said plurality of apertures having one of a pre-determined number of different dimensions, and driving means to rotate said opaque means for alternately blocking said beam and then passing said beam through said plurality of beam passing apertures thereby modulating the magnitude of the power of said radiated beam to repetitively trigger said spark gap with precise timing.

6. Apparatus as in claim 5 including:
a plurality of opposed pairs of electrodes defining a plurality of spark gaps,
each of said spark gaps being adapted for triggering at differing power levels of said radiated beam,
said pre-determined number of different dimensions corresponding to the number of spark gaps constituting said plurality of spark gaps, and
different ones of said plurality of apertures having a pre-determined dimension for allowing an amount of power to pass therethrough sufficient to trigger a pre-determined one of said plurality of spark gaps.

7. Apparatus for triggering an electrical spark gap with a radiated beam at a high rate in excess of one spark flash per second, said apparatus comprising:
at least one pair of opposed electrodes for defining said spark gap,
a high-power continuous output gas laser for continuously emitting said radiated beam in a direction passing through said spark gap,
rotatable opaque means disposed in the path of said radiated beam between said laser and said spark gap,
at least one beam passing aperture included in said opaque means, and
driving means to rotate said opaque means for alternately blocking said beam and then passing said beam through said beam passing aperture thereby repetitively triggering said spark gap with precise timing, and
speed control means for controlling the speed of said driving means, said speed control means including:
means for measuring the speed of said opaque means and for producing a first current signal proportional thereto,
means for measuring a time differential of current passing through said spark gap after said spark gap has been triggered and for producing a second current signal proportional thereto, and
means for comparing said first and said second currents and for producing a third current signal proportional to a difference of said first and second currents for operating said driving means.

References Cited

UNITED STATES PATENTS

| | | | |
|---|---|---|---|
| 1,904,124 | 4/1933 | Cockrell | 315—152 |
| 2,405,071 | 7/1946 | Tonks | 315—149 X |
| 3,033,041 | 5/1962 | Fibikar | 315—149 X |
| 3,295,011 | 12/1966 | Barbini | 313—149 X |
| 3,388,280 | 6/1968 | Delucia | 313—337 |
| 3,411,044 | 11/1968 | Langhein et al. | 317—123 |
| 3,398,322 | 8/1968 | Guenther | 315—150 |

FOREIGN PATENTS

| | | |
|---|---|---|
| 1,225,637 | 2/1960 | France. |

JOHN W. HUCKERT, Primary Examiner

A. J. JAMES, Assistant Examiner

U.S. Cl. X.R.

313—146, 149; 315—152; 331—94.5